United States Patent [19]
Takeda et al.

[11] 4,083,694
[45] Apr. 11, 1978

[54] HEAT INSULATING DEVICE FOR AN ENGINE EXHAUST SYSTEM

[75] Inventors: Noriyuki Takeda, Yokosuka; Hideo Ikeda; Iwao Nakamura, both of Yokohama; Noriaki Uchida, Tokyo, all of Japan

[73] Assignee: Nissan Motor Company, Limited

[21] Appl. No.: 668,796

[22] Filed: Mar. 19, 1976

[30] Foreign Application Priority Data

Mar. 25, 1975  Japan .............................. 50-40003[U]

[51] Int. Cl.² .................. B01J 8/02; B01J 35/00; F01N 3/14
[52] U.S. Cl. .................. 23/288 F; 60/299; 60/301
[58] Field of Search ........ 23/288 F, 288 FC, 288 FB, 23/288 FA; 60/299, 301; 180/64 A; 181/36 C, 72

[56] References Cited

U.S. PATENT DOCUMENTS

| 3,597,165 | 8/1971 | Keith et al. | 23/288 FC |
| 3,677,364 | 7/1972 | Pawlina | 181/72 X |
| 3,753,176 | 4/1976 | Santala | 23/288 F X |
| 3,819,334 | 6/1974 | Yoshida et al. | 23/288 FC |
| 3,852,041 | 12/1974 | Moore et al. | 23/288 F |
| 3,863,445 | 2/1975 | Heath | 23/288 F X |
| 3,908,372 | 9/1975 | Fowler | 23/288 F X |
| 3,963,087 | 6/1976 | Grosseau | 60/299 X |

Primary Examiner—Morris O. Wolk
Assistant Examiner—Michaels S. Marcus
Attorney, Agent, or Firm—Robert E. Burns; Emmanuel J. Lobato; Bruce L. Adams

[57] ABSTRACT

A plurality of parallel slanted fins like a louver are formed at a bottom wall of a heat insulating panel located under a catalytic converters with an exhaust pipe for attachment to an engine exhaust system.

5 Claims, 8 Drawing Figures

U.S. Patent     April 11, 1978     4,083,694
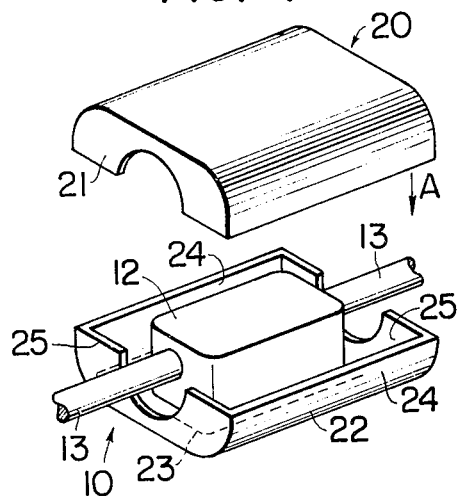
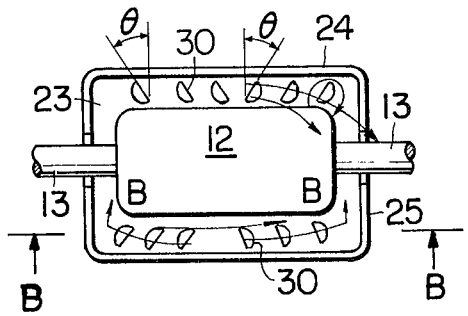
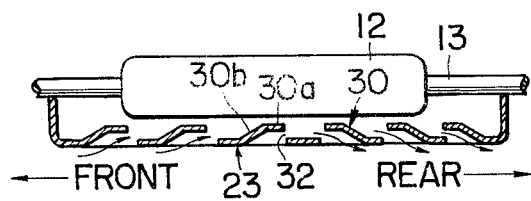
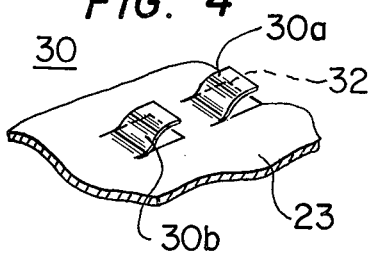
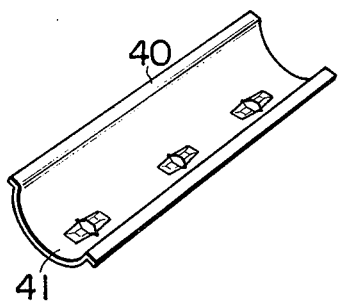
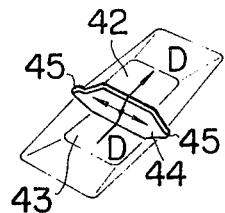
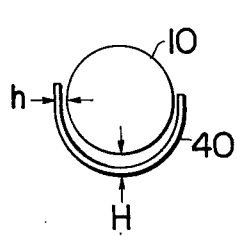
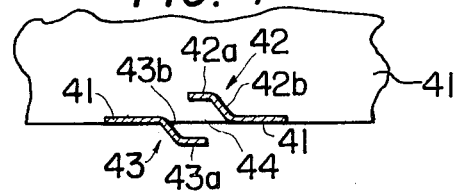

HEAT INSULATING DEVICE FOR AN ENGINE EXHAUST SYSTEM

BACKGROUND OF THE INVENTION

This invention relates generally to catalytic converters having exhaust pipe attachments for attachment to an internal combustion engine and in particular to an improved heat insulating device for such catalytic converters.

During running of an engine driven vehicle, heat developed at an exhaust system, particularly at a catalytic converter unit exposed to a high operating temperature, amounts to such a degree that dry grass and like inflammable materials on a road occasionally burns upon contact with the exhaust system. One conventional solution to this is to mount a heat insulating element beneath the underside of a converter casing or exhaust pipe of the exhaust system, or to enclose those elements in a jacket type heat insulating element.

Such structure however involves several drawbacks: the heat insulating element prevents heat from being dissipated to the outside, therefore the element itself is heated to an elevated temperature; Since the panel directly adjoins to the road surface, water is splashed into a clearance between the outer casing wall of the exhaust system and the heat insulating element rusting their metal parts, and stones or pebbles are liable to be thrown into that clearance causing offensive rattling noises.

SUMMARY OF THE INVENTION

It is therefore an object of this invention is to provide an improved heat insulating element for a catalytic converter of an exhaust system which is free from the aforementioned drawbacks and inconveniences.

Another object of this invention is to provide a heat insulating element of the nature described above which enables efficient dissipation of the heat transferred from the exhaust system and ventilation of fresh cooling air, while preventing water or pebbles or the like from entering the clearance between the a catalytic converter and the element and facilitating expelling such disturbant substances, if entered, from that clearance.

According to one important feature of this invention, a heat insulating element for a catalytic converter of the nature described above has at its wall facing the road a plurality of parallel slanted fins which define an opening between the adjacent two of them.

BRIEF DESCRIPTION OF THE DRAWING

Further objects, features and advantages of this invention will be readily understood as its detailed explanation proceeds in consideration of the appended claims, reference being had to the accompanying drawings, wherein:

FIG. 1 is a perspective view of part of a catalytic converter with a heat insulating element incorporating a preferred embodiment of this invention;

FIG. 2 is a top plan view seen in a direction along arrow A in FIG. 1;

FIG. 3 is a sectional view taken along section line B-B of FIG. 2;

FIG. 4 is an enlarged perspective view of an important part of the heat insulating element shown in FIGS. 2 and 3;

FIG. 5 is a perspective view of a heat insulating element for an exhaust pipe attachment incorporating another preferred embodiment of this invention;

FIG. 6 is an enlarged perspective view of an important part of the heat insulating element shown in FIG. 5;

FIG. 7 is a sectional view taken along section line D-D in FIG. 6; and

FIG. 8 is a sectional view of an exhaust system with a heat insulating element in a preferred exemplary arrangement.

DESCRIPTION OF THE PREFERRED EMBODIMENTS

FIG. 1 illustratively shows the embodiment in which a catalytic converter unit 12 located intermediary of an exhaust system 10 is enclosed by an envelope-like heat insulating element 20. The element 20 is separated into an upper member 21 and a lower member 22 which are both of shallow box shape, the latter having a flat bottom wall 23, two side walls 24 and two end walls 25 with apertures (no numeral) through which exhaust pipe 13 extends outwardly.

With reference to FIGS. 2 to 4, the bottom wall 23 of the lower member 22 forms a plurality of parallel slanted fins 30 like a louver, which are arranged on either side of the converter unit 2 in a row along the side walls 24. FIG. 4 particularly shows that each fin is raised toward the converter unit 12 forming a horizontal surface 30a parallel with the bottom wall 23 and an oblique surface 30b between the horizontal surface 30a and the bottom wall 23.

As best seen in FIG. 3, an opening 32 is defined between the horizontal surface 30a of any one fin and the part of the bottom wall 23 forming another, directly adjoining fin so that the plane containing the opening 32 is vertical or at least oblique to the road surface. Several or preferably half of the openings 32 face to the front of the exhaust system 10, while the rest of the openings to the rear, the two groups of the openings being devided substantially at a center cross line of the converter unit.

Also, the plane containing the openings 32 are not perpendicular to the side wall 24 but are slanted by an angle $\theta$, for instance, 30° to 45° with respect to the side wall 24, as shown in FIG. 2. Although the directions in which the openings are slanted are different and opposite across the center cross line of the converter unit, the same slanting direction may be all right. The angle $\theta$ is suitably determined in dependence on a relative position of the openings 32 and the side wall 24.

The afore-described embodiment of this invention offers a number of excellent features and advantages, a few of which are mentioned below.

As already mentioned, the plane containing the opening 32 is vertical or oblique to the road surface. This results in that various disturbant substances on the road such as water, mud, dry grass and pebbels are prevented from entering the space between the exhaust system and the heat insulating element. On the other hand, such substances, if already entered, are relatively easily expelled out by a high-velocity air flow around the heat insulating element inspired by running of the vehicle.

Since the directions in which the openings are directed are different, driving out the heat air to the outside and drawing fresh air into the inside both easily take place, effectively cooling the heat insulating element.

Also, the fact that the openings are slanted by an acute angle with respect to the side wall yields a significant ventilating effect, because air, hot or cool, flowing along the side wall easily enters and is emitted from the slanted openings.

All these features permit the heat insulating element to enjoy an elongated service life.

It may also be noted that in this example, the fins are raised toward the exhaust system so that a restricted road clearance of modern automobiles is not influenced by provision of the fins.

According to FIGS. 5 to 7, this preferred embodiment shows a heat insulating element 10 of semicylindrical shape which is particularly suited for use with an exhaust pipe 13. In practical use, the element 40 is mounted to enclose a lower part of the exhaust pipe as shown in FIG. 8.

The cylindrical bottom wall 41 of the element 40 has several pairs of step-like slanted fins, each pair consisting of a raised fin 42 and a lowered fin 43. Each of the fins forms a horizontal surface 42a and 43a and an oblique surface 42b and 43b between the horizontal surface 42a or 43a and the bottom wall 41 as in the first embodiment. As best seen in FIGS. 6 and 7, the horizontal surface 42a of the raised fin is substantially laid over the horizontal surface 43a of the lowered fin 43, defining an opening 44 therebetween. Formed at the both ends of the opening 44 are circular apertures 45 for preventing a mechanical stress from being concentrically applied to a narrow area of the edges of the opening.

Formation of the circular apertures is further advantageous in that the distance between the horizontal surface and the bottom wall lying one over another, that is, the effective area of the opening 44 can be enlarged by the radius of curvature of the circular apertures. Besides, the circular shape of the apertures is least vulnerable to a crack-shaped breakage at the both ends of the opening.

As is already apparent from FIG. 8, the heat insulating element is preferably so mounted to the exhaust pipe that the lateral distance h between the element and the exhaust pipe is substantially smaller than the vertical distance H between the same. Removal of pebbeles and the like through the openings will be further facilitated by this way of mounting.

It would be readily understood that the basic objects, features and advantages previously described in connection with the first embodiment can be achieved also by the aforementioned second embodiment. In particular, the effect of preventing entrance of pebbles and the like is ensured in this embodiment by partially laying the raised and lowered fins one over another.

What is claimed is:

1. In combination, a catalytic converter with an exhaust pipe for connection to an automotive internal combustion engine, a heat-insulating panel located beneath the catalytic converter and having two opposite sidewalls spaced laterally from respective sides of the catalytic converter and having a bottom wall integral with the sidewalls and spaced apart from a bottom surface of the catalytic converter and facing toward the surface of the ground when mounted in an automotive vehicle, a plurality of louver-shaped, slanted, parallel fins formed integrally with the bottom wall of the heat-insulating panel and defining openings through said bottom between next adjacent fins, each of said fins having a horizontal portion spaced inwardly from said bottom wall in a direction toward said catalytic converter and having a slanted portion between the horizontal portion and the bottom wall, the horizontal portion of each fin constituting an integral horizontal extension of the corresponding slanted portion, the fins being arranged spaced from each other in a longitudinal direction of the converter and heat-insulating panel.

2. The combination according to claim 1, in which said fins are arranged in two rows spaced from each other and the fins being equidistantly spaced within each of the rows.

3. The combination according to claim 1, in which said fins are equidistantly spaced in alignment in said longitudinal direction.

4. The combination according to claim 3, in which each slanted portion defines an acute angle with a plane corresponding with said bottom wall.

5. The combination according to claim 3, in which said fins are divided into two groups, the fins of one group having the slanted portions slanted in one direction toward one end of said heat-insulating panel and the fins of the other direction slanted in a direction toward the other end of said heat-insulating panel opposite to the first-mentioned end.

* * * * *